United States Patent

[11] 3,626,004

[72] Inventor Roland Maurice Guertin
Rockwood, Mich.
[21] Appl. No. 688,915
[22] Filed Dec. 7, 1967
[45] Patented Dec. 7, 1971
[73] Assignee Pennwalt Corporation
Philadelphia, Pa.

[54] METHOD OF PREPARING ALKYL SULFONYL CHLORIDE
10 Claims, 1 Drawing Fig.

[52] U.S. Cl. .................................................. 260/543 R
[51] Int. Cl. .................................................. C07c 143/70
[50] Field of Search ...................................... 260/543

[56] References Cited
UNITED STATES PATENTS
3,248,423  4/1966  Stratton ......................  260/543

Primary Examiner—Lewis Gotts
Assistant Examiner—Edward Jay Gleiman
Attorneys—William M. Epes and Stanley Litz ABSTRACT: An alkyl sulfonyl chloride is prepared continuously in high yield by reacting an alkyl mercaptan or dialkyl disulfide having one to 20 carbon atoms in the alkyl group with chlorine in a medium comprising aqueous concentrated HCl solution, in a reaction zone free of mechanical agitation means, at such feed rates that the reaction creates a turbulent condition in the reaction zone, and passing the medium into a contiguous product separation zone wherein the alkyl sulfonyl chloride is separated and withdrawn from the aqueous medium.

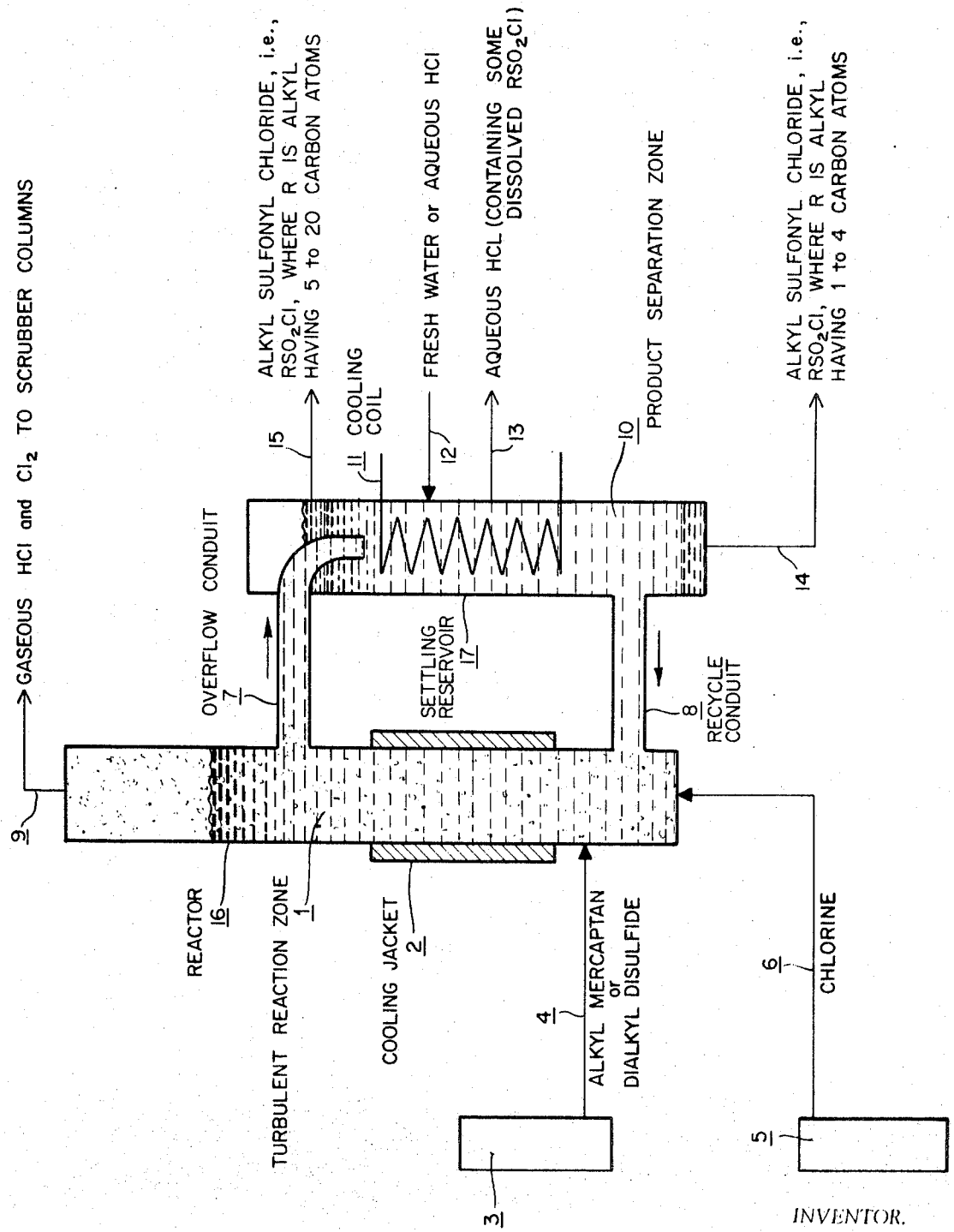

METHOD OF PREPARING ALKYL SULFONYL CHLORIDE

This invention relates to an improved process for preparing alkyl sulfonyl chlorides. More particularly, this invention concerns a continuous method of preparing an alkyl sulfonyl chloride which comprises reacting chlorine, water, and an alkyl mercaptan or alkyl disulfide, in aqueous hydrochloric acid medium in a turbulent reaction zone which is contiguous to product separation zone from which the alkyl sulfonyl chloride product is withdrawn.

In U.S. Pat. No. 2,277,325, R. Heuter et al. disclose a batch method of preparing an alkyl sulfonyl chloride wherein an alkyl mercaptan or dialkyl disulfide is suspended in water or a mixture of alcohol and water, and then treated with chlorine while stirring thoroughly. Two to 400 percent excesses of chlorine are used in carrying out the reaction. The reaction period in this batch process is of the order of 1.5 hours. Moreover, the reaction technique and product recovery steps are cumbersome and time consuming for this described process. In U.S. Pat. No. 3,248,423, G. B. Stratton prepares an alkyl sulfonyl chloride by reacting, batchwise, in a stirred aqueous medium, an alkyl mercaptan of four to 20 carbon atoms with chlorine together with a small amount of air or other source of oxygen. The mechanical agitation is necessary to keep the slurry in suspension. The disadvantages of the above-described batch process are the necessity for mechanical agitation and long reaction periods of the order of 1.5 to 12 hours.

The present invention involves a continuous method of preparing an alkyl sulfonyl chloride having one to 20 carbon atoms of high purity and in high yield which comprises the steps of:

1. contacting an alkyl mercaptan or dialkyl disulfide having one to 20 carbon atoms in an alkyl group, preferably one to 12 carbon atoms, with at least about a stoichiometric amount of gaseous chlorine in a medium comprising aqueous concentrated hydrochloric acid solution in a reaction zone at a feed rate of from about 0.005 pound-mole to about one pound mole per hour of mercaptan or disulfide per cubic foot of reaction zone volume, at a temperature within the range of about −10 to about 50° C., preferably 10 to 35° C., whereby the reaction results in a vigorous evolution of gaseous HCl which causes turbulence in said reaction zone;

2. passing the reaction medium from the turbulent reaction zone into a product separation zone wherein the alkyl sulfonyl chloride separates from the aqueous hydrochloric acid medium;

3. recycling the aqueous hydrochloric acid medium to the turbulent reaction zone; and 4. withdrawing alkyl sulfonyl chloride from the product separation zone.

The mercaptan and disulfide reactants employed in the process of this invention can be represented by the formula RSX where X is hydrogen or a radical of the formula SR′ and where R and R′ are alkyl groups having one to 20 carbon atoms, preferably up to 12 carbon atoms. R and R′ can be the same or different radicals. The alkyl groups can be substituted alkyl radicals having such substituent atoms and groups as hydroxyl, chlorine, bromine, fluorine, $NH_2$, $SO_3H$, $SO_2Cl$, and $SO_3R$. The preferred reactants are methyl mercaptan and dimethyl disulfide, however, good yields and high quality product are also obtained with ethyl mercaptan, the propyl mercaptans, the butyl mercaptans, the amyl mercaptans, the hexyl mercaptans, heptyl mercaptans, octyl mercaptans, nonyl mercaptan, decyl mercaptan, undecyl mercaptan, dodecyl mercaptan, diethyl disulfide, dibutyl disulfide, dioctyl disulfide, and the like.

The reaction embodied in the process of this invention can be exemplified by the following equation when using a mercaptan feed material:

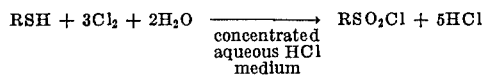

and when using a disulfide feed material:

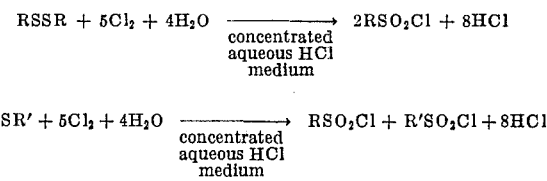

The advantages of the method of the present invention are many-fold. For instance, high yields of alkyl sulfonyl chloride are obtained using an approximately stoichiometric amount of gaseous chlorine reactant, or at the most, a slight excess thereof, for example up to only about 5 percent excess. Most significantly, the reactor or equipment requirements are very simple, no agitator or other mechanical mixing means being needed; the high turbulence required to provide the intimate contact of the reactants in the aqueous hydrochloric acid medium is produced by the evolution of the gaseous HCl byproduct. The amount of product which can be prepared per unit volume of reactor area is quite large and moreover, the yield of the alkyl sulfonyl chloride is remarkably good, i.e., at least 90 percent and often at least 95 percent, based on the mercaptan or disulfide feed. In addition, the size of reactor equipment required for high production is minimal because the required reaction time in the present process, i.e., holdup time of nonvolatile components in the reaction system, can advantageously be relatively very short, e.g., from less than one minute up to about 15 minutes, generally less than 5 minutes. This results in an appreciable savings in capital equipment expenditures. The alkyl sulfonyl chloride product as recovered from the separation zone is of surprisingly high purity, generally requiring very little further processing, for example, "topping" under reduced pressure to remove a small amount of volatile impurities. This is conveniently accomplished by subjecting the product to a slight vacuum and somewhat elevated temperatures, for instance, 75° C. at 100 mm. Hg. abs., to volatilize dissolved HCl and a small amount of residual moisture.

The method of the invention is clarified by referring to the attached drawing in which a diagrammatic flow sheet depicting a specific embodiment of the process is shown. The reactor system comprises the cylindrical reactor 16 and cylindrical settling reservoir 17 connected by overflow conduit 7 and recycle conduit 8. The reactor has optional cooling jacket 2 and the settling reservoir has an internal, coiled-tube heat exchanger 11 to remove the heat generated by the reaction and to control the temperature of the system within the desired limits. One or both of said heat exchangers can be replaced by heat exchangers situated in one or both of the conduits 7 and 8. The system is filled with concentrated aqueous hydrochloric acid solution and gaseous chlorine is metered from feed tank 5 through line 6 and sparged into the aqueous medium at the bottom of the reactor 16. Simultaneously, alkyl mercaptan or dialkyl disulfide or mixtures thereof is metered from feed tank 3 through line 4 into the reactor 16 at a point somewhat above the feed point of the chlorine. When feeding a higher dialkyl disulfide having a comparatively high melting point above about 50° 50 °it is advantageous to feed said compound as a solution in an inert solvent such as acetic acid, carbon tetrachloride, chloroform and chlorinated lower aliphatic hydrocarbons.

The intensity and vigor of the reaction causes much turbulence in the reaction zone 1 which results in the liquid level therein rising appreciably above the level of the overflow conduit 7. Byproduct gaseous HCl and unreacted chlorine pass from the reactor through line 9 to a demister unit and water-scrubber and aqueous caustic-scrubber columns. After the aqueous HCl reaction medium becomes saturated with alkyl sulfonyl chloride product, said product commences to separate therefrom in the product separation zone 10 and is continuously, or intermittently, withdrawn through line 14 or line 15, in the former case when the alkyl sulfonyl chloride has from 1 to 4 carbon atoms and the specific gravity thereof is thus greater than the specific gravity of the concentrated aqueous HCl medium, and in the latter case when the alkyl sulfonyl chloride has from five to 20 carbon atoms and the specific gravity thereof is therefor less than that of the aqueous medium. This separation of the product and its decantation is facilitated by maintaining a sufficient differential of specific gravities between the aqueous medium and the alkyl sulfonyl chloride product layers by continuously, or intermittently, withdrawing a small portion of the aqueous reaction medium from the product separation zone through line 13 while continuously, or intermittently, adding fresh water or aqueous HCl solution via line 12 to maintain the specific gravity differential and the proper liquid level in the system. It is to be understood by one skilled in the art that many variations and modifications can be made in the foregoing exemplary embodiment of the process without departing from the scope of inventive concept, for example, with regard to the type and location of entrance points for reactant streams and exit points for discharge streams.

It is desirable to carry out the process of the invention under atmospheric or slightly subatmospheric pressures in order to facilitate removal of gaseous byproducts from the reaction zone. The temperature of the reaction may range from about −10 to 50° C. however, highest yields are obtained at about 10 to 35° C.

As stated earlier, the reaction embodied herein is initiated and carried out continuously in concentrated aqueous hydrochloric acid solution. The reaction can be initiated in pure water but there is a likelihood of a flash fire in the reactor until the HCl content of the aqueous medium is established.

As previously stated, feed rates of reactants must be of a sufficient magnitude to produce vigorous turbulence in the reaction zone to ensure intimate contact of the reactants and a high yield of product while dispensing with the need of mechanical means of agitation therein and its attendant capital investment and maintenance costs. A feed rate of at least about 0.005 pound-mole per hour of mercaptan or disulfide per cubic foot of reaction zone is desirable. A practical upper limit for this feed rate is in the range of about one pound-mole per hour of mercaptan or disulfide per cubic foot of reaction zone. The preferred range is about 0.005 to about 0.03 pound-mole per hour per cubic foot.

It is desirable to periodically monitor the density of the aqueous hydrochloric acid medium in the settling reservoir to ensure that there is a specific density differential between this layer and the alkyl sulfonyl chloride product layer in order to maintain a separation of the two phases in the product separation zone. The density differential is maintained by withdrawing a small requisite amount of the aqueous medium and replacing the withdrawn amount in the system with fresh aqueous HCl solution of fresh water. The withdrawn aqueous concentrated HCl medium contains dissolved alkyl sulfonyl chloride in a minor amount equivalent to the saturation concentration at the system temperature, for example about 10 percent of methane sulfonyl chloride at 25° C. This product can be recovered in useful form by hydrolyzing the alkyl sulfonyl chloride to the corresponding sulfonic acid.

The following examples which are set forth to further illustrate the method of this invention should not be construed as limitative of the scope of the invention as described herein and defined by the claims.

EXAMPLE 1

The apparatus used comprised a vertical, tubular, 4-inch diameter glass reactor 100 inches long connected to a 4-inch diameter, 62-inch long settling reservoir by a horizontal recycle conduit at the bottom and an overflow conduit about 60 inches from the bottom, each conduit having a diameter of 3 inches. The volume of the reactor zone up to the overflow conduit was about 3.36 gallons. The settling reservoir (i.e., the product separation zone) contained a water-cooled, coiled-tube heat exchanger. The liquid volume of the settling reservoir was 4.4 gallons.

The system was filled with 37 percent aqueous HCl up to the overflow conduit. Gaseous chlorine was metered into the bottom of the reactor. Vaporized methyl mercaptan was metered into the reactor about 18 inches above the chlorine feed entrance. The reaction was very vigorous, causing much turbulence in the reaction zone so that the turbulent reaction zone was about 54 to 74 inches long, equivalent to a volume of about 2.9 to 4 gallons. Unreacted chlorine and byproduct HCl passed from the top of the reactor through a demister unit, a water scrubber column, and an aqueous caustic scrubber column from which the system was vented to the atmosphere. The reactant feed rates are given in the operating data presented hereinbelow. After about 50 minutes of operation, the aqueous HCl solution became saturated with methane sulfonyl chloride (about 10 percent concentration at 25° C.) which liquid product continuously precipitated from solution and was withdrawn from the bottom of the settling reservoir. In order to maintain an adequate density differential in the settling zone to permit the decantation of the methane sulfonyl chloride, a small portion of the concentrated aqueous HCl solution was intermittently withdrawn from the settling reservoir and replenished by fresh water. The specific gravity of the aqueous HCl phase ranged from about 1.2 to about 1.3 at 25° C., compared to a specific gravity for the ethane sulfonyl chloride product layer of 1.475 to 1.480 at 25°C.

The data for the run is tabulated in the following table:

| | |
|---|---|
| Duration of Run | 23 hrs. 22 minutes |
| Reaction System temperature range | 20 to 28° C. |
| Temperature for 90% of run | 25° C. |
| Circulation rate of aqueous HCl phase | 14 gallons/minute |
| Methyl Mercaptan Feed Rate | 4.46 lbs/hr. |
| Total Methyl Mercaptan Fed | 104 pounds |
| Chlorine Feed Rate | 20.7 lbs/hr. |
| Total Chlorine Fed | 483.4 pounds |
| Excess chlorine based on CH$_3$SH fed | 5% |
| Total water consumed | 80.7 lbs. |
| Excess water based on CH$_3$SH fed | 3% |
| Methane sulfonyl chloride collected | 235.6 pounds |
| Methane sulfonyl chloride production rate | 10.1 lbs/hr. |
| Average reaction time | 0.5 minute |
| Yield of methane sulfonyl chloride based on 99% pure CH$_3$SH fed | 95.6% |
| Purity of methane sulfonyl chloride determined by: | |
| (1) Vapor phase chromatography | 99.9% |
| (2) Acid/base saponification | 100% |
| (3) Chloride saponification | 100% |

EXAMPLE 2

The techniques described in example 1 were modified slightly by substituting butyl mercaptan, metered as a liquid into the reaction zone, for the methyl mercaptan reactant of the previous example. The butyl sulfonyl chloride product was withdrawn as the lower phase from the settling reservoir; its specific gravity ranged from 1.229 to 1.233 at 20° C. compared to a specific gravity of 1.205 to 1.215 at 20° C. for the upper-phase, aqueous HCl layer. The yield of the butyl sulfonyl chloride averaged 94 percent based on the butyl mercaptan fed. The purity of the product was 98.1 percent by acid-base hydrolysis and 98.3 percent by chloride hydrolysis.

EXAMPLE 3

Employing the techniques described in the previous examples, dimethyl disulfide was reacted with a stoichiometric amount of chlorine in concentrated aqueous HCl medium at 19 to 28° C. The yield of methane sulfonyl chloride product was 99 percent.

EXAMPLE 4

The procedures of the preceding examples were repeated using sec-butyl mercaptan as starting material and a reaction temperature of 20–25° C. The yield of sec-butyl sulfonyl chloride was 95.6 percent.

EXAMPLE 5

The procedures of the preceding examples were repeated using cyclohexyl mercaptan as starting material. The yield of cyclohexyl sulfonyl chloride was 99 percent.

EXAMPLE 6

Employing the techniques described in the preceding examples, octyl sulfonyl chloride was prepared by reacting octyl mercaptan with chlorine in concentrated aqueous HCl medium with the difference that the octyl sulfonyl chloride, specific gravity range of 1.090–1.100 at 20°, was recovered by decantation as the upper-phase from the settling zone; the specific gravity of the lower-phase, aqueous HCl layer ranged from 1.19 to 1.30 at 20° C. The yield of the essentially 100 percent pure octyl sulfonyl chloride, after topping, was about 95 percent on the octyl mercaptan consumed.

EXAMPLE 7

The techniques described in example 6 were repeated using dodecyl mercaptan as the mercaptan reactant. The specific gravity of the dodecyl sulfonyl chloride, withdrawn as product by decantation from the upper portion of the settling reservoir, was 1.040 at 20° C., compared to 1.20 at 20° C. for the aqueous HCl lower phase. The yield, after topping, of the essentially 100 percent pure dodecyl sulfonyl chloride was 97.3 percent on the mercaptan fed.

I claim:

1. A continuous method of preparing an alkyl sulfonyl chloride have one to 20 carbon atoms in the alkyl group which comprises contacting a sulfur-containing reactant having the formula RSX, where X is hydrogen or a radical of the formula SR' and where R and R' are alkyl radicals having one to 20 carbon atoms, with chlorine in an amount ranging from stoichiometric up to about 5 percent excess based on the amount of the RSX feed, in a medium comprising aqueous concentrated hydrochloric acid solution in a reaction zone at a feed rate of from about 0.005 pound-mole to about one pound-mole per hour of RSX per cubic foot of the reaction zone, at a temperature of from about −10 to about 50° C., whereby the reaction of the RSX with chlorine and water results in a vigorous evolution of gaseous HCl which produces turbulence and intimate contact of the reactants in said reaction zone, passing the reaction medium from the turbulent reaction zone into a product separation zone wherein the alkyl sulfonyl chloride phase separates from the aqueous hydrochloric acid phase, recycling the aqueous hydrochloric acid phase to the turbulent reaction zone, and withdrawing alkyl sulfonyl chloride product from the product separation zone, the withdrawal of said product being from the bottom of the product separation zone when the alkyl sulfonyl chloride has from one to four carbon atoms, and said withdrawal being from the top of the product separation zone when the alkyl sulfonyl chloride has from five to 20 carbon atoms.

2. The method according to claim 1 wherein the temperature of the reaction is from about 10 to 35° C.

3. The method according to claim 2 wherein the feed rate of RSX is from about 0.005 pound-mole to about 0.03 pound-mole per hour per cubic foot of reaction zone.

4. The method according to claim 1 wherein R and R' are alkyl radicals having one to 12 carbon atoms.

5. The method of claim 1 wherein the sulfur containing reactant is methyl mercaptan.

6. The method of claim 1 wherein the sulfur containing reactant is butyl mercaptan.

7. The method of claim 1 wherein the sulfur containing reactant is dimethyl disulfide.

8. The method of claim 1 wherein the sulfur containing reactant is dibutyl disulfide.

9. The method of claim 1 wherein the sulfur containing reactant is octyl mercaptan.

10. The method of claim 1 wherein the sulfur containing reactant is dodecyl mercaptan.

* * * * *

PO-1050
(5/69)

UNITED STATES PATENT OFFICE
CERTIFICATE OF CORRECTION

Patent No. _____3,626,004_____  Dated __February 25, 1972__

Inventor(s) ___Roland Maurice Guertin___

It is certified that error appears in the above-identified patent and that said Letters Patent are hereby corrected as shown below:

Column 2, line 62, "50° 50°" should read --50°C.--

Column 4, line 28, "ethane" should read --methane--

Column 5, line 17, after "percent" insert --based--

Column 5, line 27, after "percent" insert --based--

Signed and sealed this 30th day of May 1972.

(SEAL)
Attest:

EDWARD M. FLETCHER, JR.
Attesting Officer

ROBERT GOTTSCHALK
Commissioner of Patents